United States Patent [19]
Talmo et al.

[11] 3,722,264
[45] Mar. 27, 1973

[54] TRANSDUCER AND COMPONENTS THEREFOR

[75] Inventors: Robert Eugene Talmo, Pasadena; Donald L. Ham, Arcadia; Lowell J. Leyrer, Costa Mesa, all of Calif.

[73] Assignee: International Telephone and Telegraph Corporation, New York, N.Y.

[22] Filed: Jan. 25, 1971

[21] Appl. No.: 109,224

[52] U.S. Cl............73/88.5 R, 73/398 AR, 73/141 A
[51] Int. Cl.............................G01l 1/22, G01b 7/18
[58] Field of Search.........73/88.5 R, 88.5 SD, 141 A, 73/398 AR, 407 R

[56] References Cited

UNITED STATES PATENTS

| | | |
|---|---|---|
| 3,518,886 | 7/1970 | Talmo et al.....................73/88.5 R X |
| 3,111,620 | 11/1963 | Baker..........................73/141 A UX |
| 3,178,938 | 4/1965 | Ruge..................................73/141 A |
| 3,448,607 | 6/1969 | Russell.............................73/88.5 R |
| 3,490,272 | 1/1970 | Russell.............................73/88.5 R |
| 3,203,223 | 8/1965 | Petrow..................................73/1 B |
| 3,074,175 | 1/1963 | Ludlam........................73/88.5 R X |
| 3,603,159 | 9/1971 | Morrow............................73/517 R |

FOREIGN PATENTS OR APPLICATIONS

| | | |
|---|---|---|
| 1,189,601 | 4/1970 | Great Britain....................73/88.5 R |

*Primary Examiner*—Charles A. Ruehl
*Attorney*—C. Cornell Remsen, Jr., Walter J. Baum, Paul W. Hemminger, Charles L. Johnson, Jr. and Thomas E. Kristofferson

[57] ABSTRACT

A differential pressure unit having an internal leaf spring cantilever strain gage beam in which the normally fixed end of the beam is adjustable in position throughout a predetermined range.

8 Claims, 4 Drawing Figures

3,722,264

PATENTED MAR 27 1973

INVENTORS
ROBERT E. TALMO
DONALD L. HAM
LOWELL J. LEYRER
BY: *[signature]*
ATTORNEY

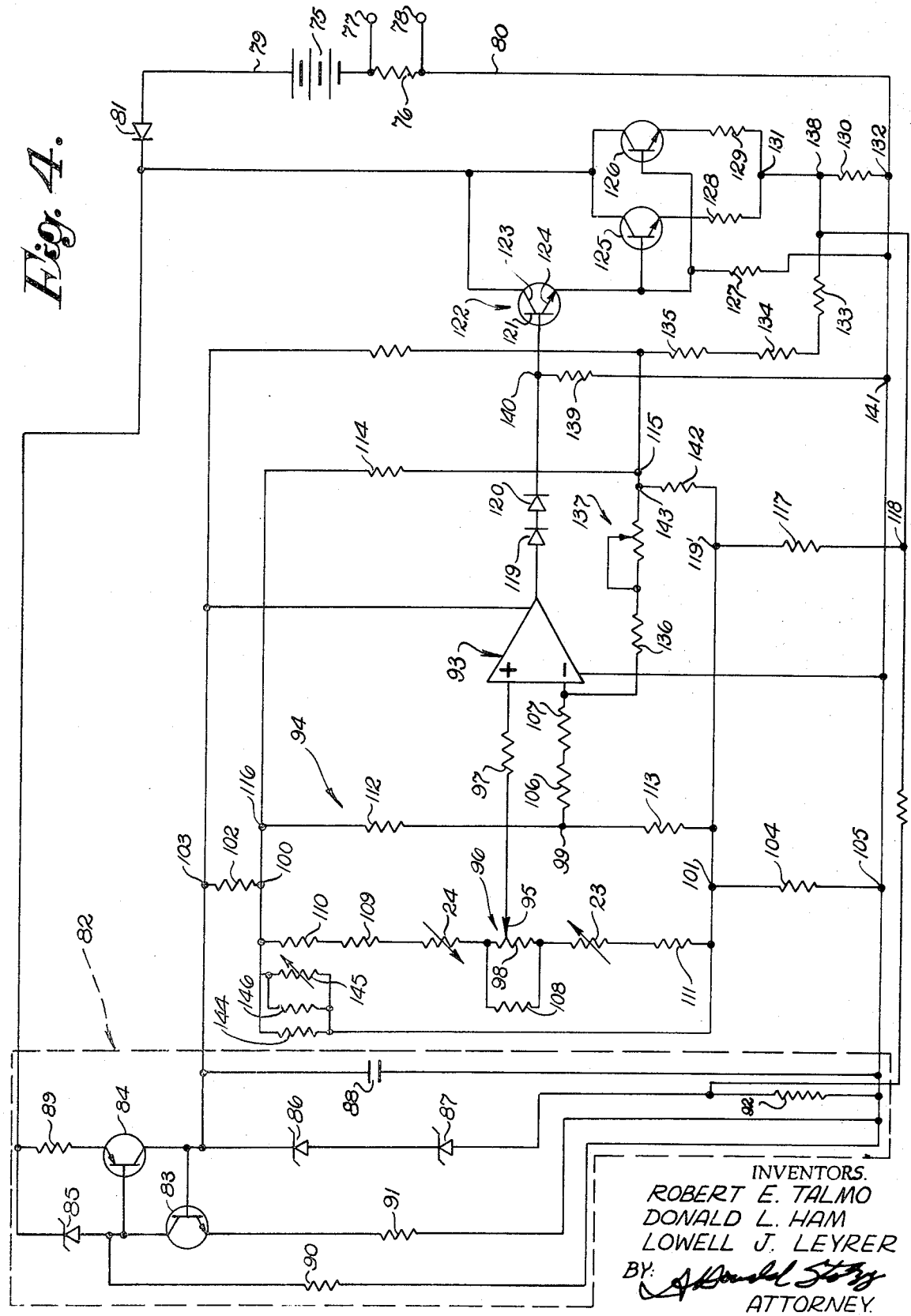

TRANSDUCER AND COMPONENTS THEREFOR

BACKGROUND OF THE INVENTION

This invention relates to devices for converting one form of energy into another, and more particularly, to a transducer and components therefor.

Although the device and components of the present invention will have utility in many other applications not disclosed herein, the invention will be found to possess considerable utility when employed with differential pressure units such as disclosed in U.S. Pat. No. 2,917,081 and U.S. Pat. No. 2,664,749.

It is prior art to this invention that spring metal bellows acted upon by the pressure of a fluid are employed to deflect a leaf spring cantilever beam to which strain gages are fixed. The electrical resistances of the strain gages thus vary in accordance with the said pressure or pressure differential. For example, see U.S. Pat. Nos. 3,343,420; 2,772,569; 2,593,169; 3,022,672; 3,248,936; 3,161,061; 2,344,642; 2,442,938; 2,920,487; 3,168,826; 3,307,100; 3,327,270; 3,389,362 and 3,518,886.

In the past it has been difficult and has introduced inaccuracies to adjust the cantilever beam for zero strain indication, calibration or otherwise.

SUMMARY OF THE INVENTION

In accordance with the device of the present invention, the above-described and other disadvantages of the prior art are overcome by providing an auxiliary leaf spring cantilever beam in addition to that to which the strain gages are fixed. The strain gage beam then has one end fixed to the "free" end of the auxiliary beam. The free end of the auxiliary beam is not exactly "free," but its position is adjustable over a range. The free end of the auxiliary beam may thus be moved to wherever desired and then clamped in that position.

It is an outstanding advantage of the present invention that the auxiliary beam provides a leaf spring hinge for adjustment of the strain gage beam. The hinge is thus inherently stable in position and does not introduce any inaccuracies in the output. The clamp holds it tight, and by being integral with its fixed end, it does not move in place or vibrate.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 4 is a schematic diagram of a circuit employed with the transducer shown in FIGS. 1, 2 and 3.

DESCRIPTION OF THE PREFERRED EMBODIMENT

Figure 1:
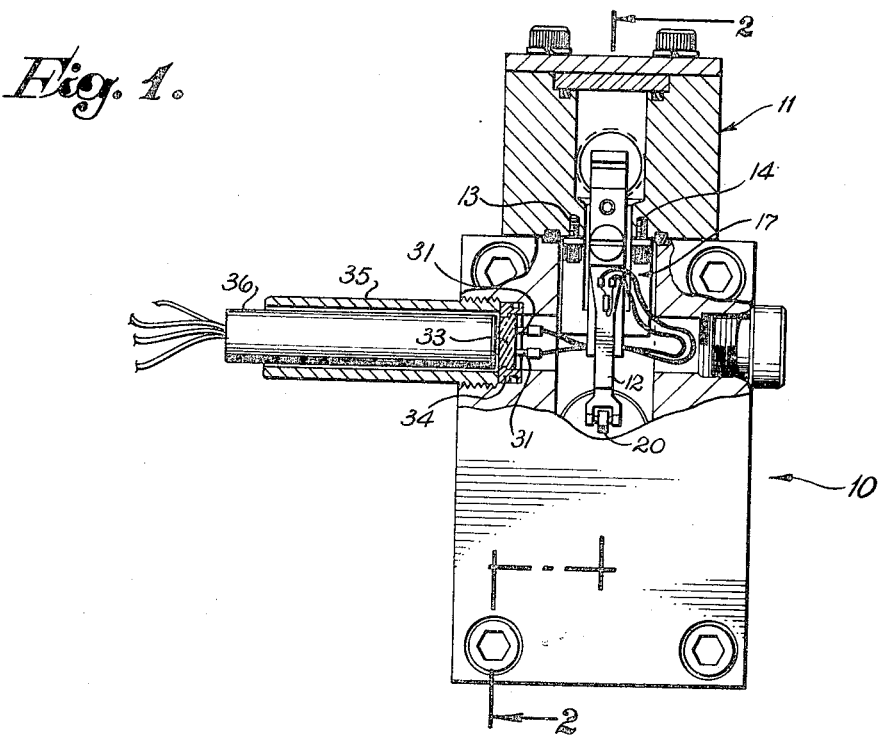
FIG. 1 is an end elevational view, partly in section, of a transducer constructed in accordance with the present invention.

In the drawings, in FIG. 1, a transducer is indicated at 10 having a central body portion 11 housing an adjustable mounting for a cantilever leaf spring strain gage beam 12. Screws 13 and 14 hold upper ends 15 and 16 of a U-shaped member 17 in a fixed position relative to body 11.

Figure 2:
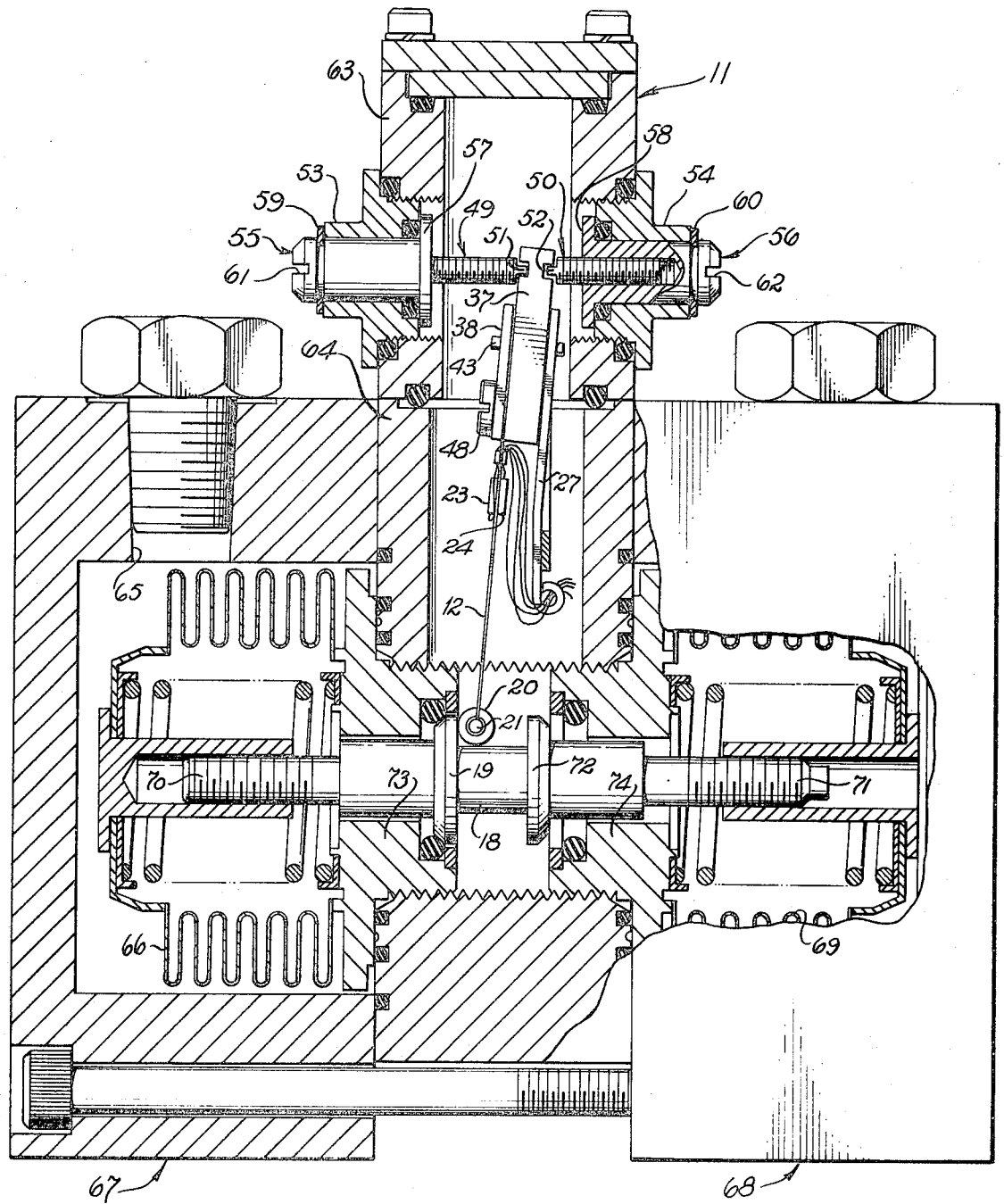
FIG. 2 is a longitudinal sectional view through the transducer taken on the line 2—2 shown in FIG. 1.

As shown in FIG. 2, a valve stem 18 moves in accordance with differential pressure. A flange 19 is fixed to valve stem 18. Flange 19 engages a roller 20 which is fixed to shaft 21 that is journaled in a clevis part of strain gage beam 12. This arrangement is shown in all three of FIGS. 1, 2 and 3.

As shown in FIG. 2, strain gages 23 and 24 are fixed to opposite sides of beam 12.

Figure 3:
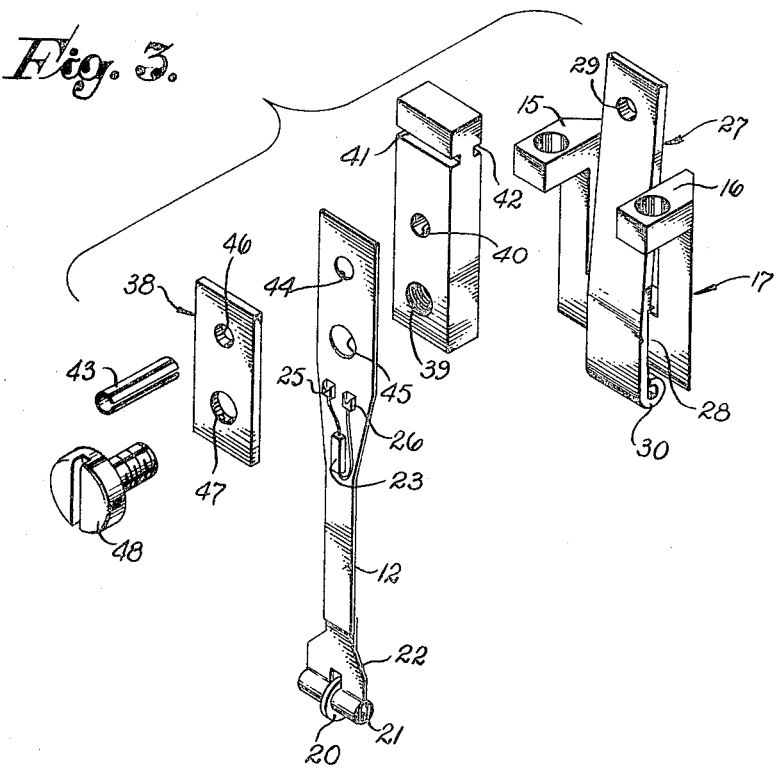
FIG. 3 is an exploded perspective view of a strain gage beam and an adjustable mounting therefor.

As shown in FIG. 3, electrical contacts 25 and 26 are provided for the electrical leads from strain gage 23. Similar contacts may be provided for strain gage 24.

A second cantilever leaf spring 27 is fixed to the portion 28 of member 17. Beam 27 has a hole 29 therethrough, and a curled end 30 through which four leads extend from the strain gage contacts to four pins 31, shown in FIG. 1. Pins 31 are sealed through a glass disc 33 in a ring 34 that seats into body 11 and is held in place by a threaded cylinder 35.

Four pins 31 are provided, one for each lead from each contact on beam 12. An electrical connector 36 is plugged onto those portions of the pins 31 which project beyond disc 33 to the left thereof, as viewed in FIG. 1.

As shown in FIGS. 2 and 3, block 37 is located contiguous to beam 27. Beam 12 is located contiguous to block 37, and a plate 38 is located contiguous to beam 12.

In actual practice, beam 27 is first brazed to member 17. Block 37 has a threaded hole 39, and a smooth cylinder hole 40. Block 37 also has grooves 41 and 42.

Block 37 is brazed to beam 27 in the position shown in FIG. 2 with holes 29 and 40 in registration. A pin 43 is then press-fit into the registering holes 29 and 40.

Beam 12 has holes 44 and 45. Plate 38 has holes 46 and 47.

To complete the assembly, holes 44 and 46 are located around pin 43, and a screw 48 is projected through holes 45 and 47, and threaded into block hole 39. The block hole 39 will be deeper than the length of the shank of screw 48.

As shown in FIG. 2, threaded shafts 49 and 50 have screwdriver projections 51 and 52 to fit in block notches 41 and 42, respectively.

On each side of the body 11, ferrules 53 and 54 hold the structure internal thereof in place. The structure internal of ferrule 53 is identical to that shown inside ferrule 54. Shafts 49 and 50 move axially but do not rotate. They are moved axially by turning fixed nuts 55 and 56. Nuts 55 and 56 have flanges 57 and 58 which prevent movement of nuts 55 and 56 outwardly of body 11. Snap rings 59 and 60 prevent movement of nuts 55 and 56 inwardly of body 11. Nuts 55 and 56 have screwdriver slots 61 and 62 by which they may be turned.

In accordance with the foregoing, the position of beam 12 may be adjusted by first moving nuts 55 and 56 so that there is some play or permitted by movement of block 37 relative to shafts 49 and 50. One of the nuts 55 and 56 may thus be turned to move both beam 27 and beam 12. The brazed connected between block 37 and beam 27 causes beam 27 to bend near the portion 28 of member 17 and act as a cantilever beam hinge for the upper fixed end of beam 12. The upper end of beam 12 is fixed relative to the upper end of beam 27, as explained previously.

When the block 37 has been located, nuts 55 and 56 are turned to cause block 37 to have been squeezed between the shaft projections 51 and 52, and to be jammed or frozen therebetween. Thus, even through the location of beam 12 is adjustable, its position can be fixed after it has been adjusted. Moreover, when the position of beam 12 is fixed, the threads of shafts 49 and 50 are, more or less, jammed so that the location of beam 12 will not be easily changed after it has been adjusted and fixed.

Body portion 11 principally includes an upper portion 63 and a lower portion 64. Except as described herein previously, all of the structure outside of lower portion 64 below its upper end may be any entirely conventional differential pressure unit. However, the invention is not limited to the measurement of differential pressure.

In FIG. 2, the pressure of a fluid may be introduced at a port 65 surrounding a metal bellows 66. Port 65 is provided through an end bell 67. The right-hand half of the unit also includes an end bell 68 which may be provided with a port similar to port 65. The right-hand half may also include a metal bellows 69. Valve stem 18 may be fixed to one end of each of the bellows 66 and 69 by threaded connections 70 and 71 therethrough, if desired. Flanges 19 and 72 protect the unit in the event of overpressure, as is conventional.

As is conventional, an imcompressible fluid completely fills the interior of body 11, bellows 66 and bellows 69. The shaft of valve stem 18 may also be smaller than the clearance with parts 73 and 74 so that the pressure inside the bellows 66 and 69 is the same as that throughout the interior of body 11.

In FIG. 4, the strain gages 23 and 24 are indicated by variable resistors. A supply voltage of between 22 and 80 volts D.C. may be supplied by a D.C. source of potential 75. A load is indicated at 76 having output terminals 77 and 78.

An output is provided which is a current that is a function of differential pressure. This current is supplied in pairs with leads 79 and 80. Since the device of the present invention is essentially current sensitive, the lead 79 and 80 may be of any length, yet, the accuracy of the output signal will not be affected.

A diode 81 is connected in series with source 75 to protect the circuit in the event that the source 75 is connected with the wrong polarity. A dotted box 82 may be any entirely conventional voltage regulation circuit. Circuit 82 includes transistors 83 and 84; Zener diodes 85, 86 and 87; a capacitor 88; and resistors 89, 90, 91 and 92.

An entirely conventional differential amplifier is indicated at 93 connected from a bridge 94. Amplifier 93 has a plus input connected from a wiper 95 of a potentiometer 96 through a resistor 97. Potentiometer 96 has a winding 98. One corner of the bridge is located at the point of contact of wiper 95 on winding 98. Another corner of the bridge is located at a junction 99. Still another corner of the bridge is located at a junction 100. A further corner of the bridge is located at a junction 101.

A resistor 102 is connected from a positive junction 103 to junction 100. A resistor 104 is connected from junction 101 to a negative junction 105.

Amplifier 93 has a minus input from junction 99 through resistors 106 and 107.

One leg of the bridge includes potentiometer 96 with a resistor 108 connected in parallel therewith, strain gage 24 and resistors 109 and 110.

Another leg of the bridge includes potentiometer 96, resistor 108, strain gage 23 and a resistor 111.

Another leg of the bridge includes a resistor 112. Still another leg of the bridge includes a resistor 113.

A positive feedback resistor 114 is connected from a junction 115 to a junction 116. A negative feedback resistor 117 is connected from a junction 118 to a junction 119. One of the resistors 114 and 117 is always omitted, as will be explained.

Diodes 119 and 120 are connected from the output of amplifier 93 to the base 121 of transistor 122 having a collector 123 and an emitter 124. Transistor 122, and transistors 125 and 126 are all three connected as emitter followers. Transistor 122 has an emitter resistor 127 connected therefrom. Similarly, transistors 125 and 126 have emitter resistors 128 and 129 connected therefrom, respectively. A resistor 130 is connected from a common junction 131 of resistors 128 and 129 to a negative junction 132.

Resistors 133, 134, 135 and 136 with a variable resistor 137 form a feedback circuit to the minus input of amplifier 93 from a junction 138.

A resistor 139 is connected from a junction 140 to a negative junction 141. A resistor 142 is connected from a junction 143 to junction 119.

A number of additional resistors are illustrated in FIG. 4 for tailoring purposes. Two of these resistors are indicated at 144 and 145.

The resistance of resistor 144 is selected to produce a predetermined voltage at the output of amplifier 93 at room temperature for a full scale deflection of beam 12.

The resistance of resistor 145 is selected to correct for any change in span with temperature. The change in span is first measured by shorting out resistor 145. The output of amplifier 93 is then measured four times. It is measured for the zero deflection of beam 12 at room temperature. It is measured for the full scale deflection of beam 12 at room temperature. It is measured for zero deflection at, say 100°F. It is again measured for full scale deflection at 100°F.

Span is defined as the difference between the full scale and zero outputs of amplifier 93. If the span for room temperature is different from that for 100°F., resistor 145 is selected to have a resistance to make the room temperature span equal to the span at 100°F.

One of the resistors 109 and 111 is temperature sensitive and has a positive temperature coefficient. The other of the resistors 109 and 111 is not temperature sensitive. The resistors 109 and 111 are employed to compensate for a zero shift with temperature.

Initially, resistors 109 and 111 are shorted out. The wiper 95 of potentiometer 96 is then adjusted at room temperature to produce a zero output from amplifier 93. The temperature is then varied to determine the magnitude and sign of the zero shift error. Resistors 109 and 111 are then selected to have values to null out the zero shift, and the shorts thereacross removed.

Resistor 145 is a temperature sensitive resistor. Resistor 146 is not a temperature sensitive resistor.

Variable resistor 137 fits the full scale or output voltage of amplifier 93 for the maximum deflection of beam 12.

Resistors 114 and 117 are used to correct for nonlinearity. Only one of the resistors 114 and 117 is used at a time.

It is a feature of the invention that strain gages 23 and 24 are bonded to beam 12 with a thin sheet of glass.

Amplifier 93 is conventional. Thus, an increase in the potential of the plus input causes an increase in the output thereof when the minus input is maintained constant. A decrease in the plus input potential causes the output of the amplifier to decrease when the minus input remains constant. Conversely, when the minus input rises and the plus input remains constant, the output decreases. When the minus input falls and the plus input is constant, the output rises.

The phrase "means to apply a D.C. voltage" as used herein and in the claims is hereby defined to include, but not be limited to, lead wires, a power supply, a battery or otherwise.

The point of contact of wiper 95 or winding 98 is hereby defined for use herein and in the claims to include, but not be limited to, a "bridge corner" or a "junction."

Due to the fact that tailoring may or may not be needed, many of the resistors disclosed in the circuit of FIG. 4 may be omitted or shorted, as desired.

For use herein, the junction 105 is hereby defined as "circuit ground" whether or not junction 105 is in fact grounded.

For the span compensation provided by resistors 145 and 146, the resistances of resistors 145 and 146 may be such that, $$V_{ofr} - V_{ofd} = 0$$

where, $$V_{ofr} = V_{fr} - V_{or}, \text{ and}$$

$$V_{ofd} = V_{fd} - V_{od},$$

where, $V_{fr}$ is the difference of potential between wiper 95 and junction 99 at room temperature when beam 12 is deflected full scale, $V_{or}$ is the difference of potential between wiper 95 and junction 99 at room temperature when the deflection of beam 12 is zero, $V_{fd}$ is the difference of potential between wiper 95 and junction 99 at a predetermined temperature different from room temperature when beam 12 is deflected full scale, and $V_{od}$ is the difference of potential between wiper 95 and junction 99 at the said predetermined temperature when the beam 12 has a zero deflection.

What is claimed is:

1. A transducer comprising: a base; first and second leaf spring cantilever beams each having first and second ends; first means mounting the first end of said first beam in a position fixed relative to said base; second means mounting the first end of said second beam in a fixed position relative to the second end of said first beam, said beams being movable in tandem over a predetermined range at said first end of said second beam and at said second end of said first beam; third means actuable to hold said second and first ends of said first and second beams, respectively, in fixed positions relative to said base; and at least one strain gage bonded to one side of said second beam between the ends thereof to take either a compression load or a tensile load.

2. The invention as defined in claim 1, including a member to deflect the second end of said second beam relative to said base, said base having fourth means to guide movement of said member, and fifth means carried by said member for applying a force to said member to deflect said second beam as aforesaid.

3. The invention as defined in claim 1, wherein said first means includes an approximately upright U-shaped bracket having a bight portion and two legs attached to and extending upwardly from each end of said bight portion, and fourth means fixing the upper ends of said legs to said base, said first end of said first beam being fixed at the center of said bight portion so that said first beam extends upwardly between said legs, a block, fifth means to fix one side of said block to the other end of said first beam, said block extending upwardly to a position above the said second end of said first beam, sixth means to clamp said one end of said second beam to a side of said block opposite said one side, said block having first and second screw driver slots in said one and opposite sides thereof at a position above the upper end of said first beam, the upper end of said second beam being below the position of said slots, first and second threaded shafts, first and second ferrules threaded to said first and second shafts, respectively, said first and second shafts having first and second axial screw driver projections extending into said first and second slots, respectively, seventh and eighth means to hold said first and second ferrules, respectively, in fixed axial but rotatable angular positions relative to said base, rotation of one or both of said ferrules causing said shafts to be placed in axial compression and to hold said block in a fixed position relative to said base, the threaded connection of said shafts and said ferrules wedging and freezing said block between said shafts in the manner of a jam nut, said shafts both having a common symmetrical axis.

4. The invention as defined in claim 1, wherein said second means includes an extension fixed relative to the said first end of said second beam and the said second end of said first beam, and fourth means mounted on said base and actuable to move said extension, and fifth means to freeze the position of said extension relative to said base at any selected point within a predetermined range of movement of said extension.

5. The invention as defined in claim 1, wherein said second means includes a block, fourth means to fix one side of said block to the second end of said first beam, fifth means to clamp said first end of said second beam to a side of said block opposite said one side, and sixth means actuable to clamp said block at any point within a predetermined range of positions to hold said block at a selected angle relative to said base.

6. The invention as defined in claim 5, wherein said sixth means is releasable to allow movement of said block to a different point and is actuable to clamp said block at a position different from that at which it was previously released.

7. A transducer comprising: a Wheatstone bridge including first, second, third and fourth legs connected between first and second, second and third, third and fourth, and fourth and first junctions, respectively; means to maintain said second and fourth junctions at different D.C. potentials; a base; a leaf spring cantilever beam having one end fixed to said base, said first and fourth legs including first and second resistance strain gages, respectively, said first and second strain gages being fixed to first and second opposite sides of said beam, respectively, between the ends thereof; means actuable to move the other end of said beam to stress said strain gages; an operational amplifier having plus and minus inputs and an output, said plus and minus inputs being connected from said first and third junctions, respectively; an emitter follower connected from said output to circuit ground, said emitter follower including a transistor having an emitter and an emitter resistor connected from said emitter to circuit ground; and a feedback circuit connected from the junction of said emitter resistor with said emitter to one of said second and fourth junctions.

8. The invention as defined in claim 7, wherein said second and third bridge legs include second and third resistors, respectively, said second and third resistors having approximately the same resistance.

* * * * *